(12) United States Patent
Yang et al.

(10) Patent No.: US 7,701,098 B2
(45) Date of Patent: Apr. 20, 2010

(54) MOUNTING STRUCTURE FOR A STATOR OF A MOTOR

(75) Inventors: Zhi-Ya Yang, Shenzhen (CN); Ying-Sen Chen, Taipei Hsien (TW); Wen-Gao Wang, Shenzhen (CN); Shu-Ho Lin, Taipei Hsien (TW)

(73) Assignees: Fu Zhun Precision Industry (Shen Zhen) Co., Ltd., Shenzhen, Guangdong Province (CN); Foxconn Techology Co., Ltd., Tu-Cheng, Taipet Hsien (TW)

( * ) Notice: Subject to any disclaimer, the term of this patent is extended or adjusted under 35 U.S.C. 154(b) by 321 days.

(21) Appl. No.: 11/695,448

(22) Filed: Apr. 2, 2007

(65) Prior Publication Data

US 2008/0157633 A1    Jul. 3, 2008

(30) Foreign Application Priority Data

Dec. 29, 2006    (CN) .................... 2006 1 0064581

(51) Int. Cl.
*H02K 7/00* (2006.01)
(52) U.S. Cl. ................. 310/67 R; 310/91; 310/216.124
(58) Field of Classification Search ............... 310/67 R, 310/91, 216.124
See application file for complete search history.

(56) References Cited

U.S. PATENT DOCUMENTS

| | | | | |
|---|---|---|---|---|
| 4,540,906 | A * | 9/1985 | Blom ....................... | 310/67 R |
| 4,682,065 | A * | 7/1987 | English et al. ................ | 310/90 |
| 6,800,975 | B2 * | 10/2004 | Long ........................... | 310/89 |
| 6,882,074 | B2 | 4/2005 | Horng et al. | |
| 6,969,200 | B2 * | 11/2005 | Chou ......................... | 384/428 |
| 7,015,610 | B2 | 3/2006 | Horng et al. | |
| 7,061,151 | B2 * | 6/2006 | Liao ........................... | 310/90 |
| 7,416,388 | B2 * | 8/2008 | Huang et al. ............. | 415/214.1 |
| 7,608,960 | B2 * | 10/2009 | Yang et al. .................... | 310/91 |
| 2004/0061407 | A1 * | 4/2004 | Miyake et al. ............. | 310/216 |
| 2005/0002808 | A1 * | 1/2005 | Huang et al. ........... | 417/423.15 |
| 2005/0046286 | A1 * | 3/2005 | Horng et al. ............. | 310/67 R |
| 2005/0194860 | A1 * | 9/2005 | Lee ............................. | 310/217 |
| 2006/0113854 | A1 * | 6/2006 | Kadowaki et al. ............. | 310/90 |

* cited by examiner

*Primary Examiner*—Quyen Leung
*Assistant Examiner*—Terrance Kenerly
(74) *Attorney, Agent, or Firm*—Frank R. Niranjan

(57) ABSTRACT

A mounting structure for a motor includes a tube and a stator. The tube includes at least an axial positioning block and at least a radial mounting block. The stator defines an axis hole for receiving a portion of the tube therein, and at least a positioning groove in an inner surface thereof. One of the stator and the tube is rotated from an unlock position, where the at least an axial positioning block is located just above the at least a positioning groove, to a locked position, where a bottom surface of the at least an axial positioning block abuts a top surface of the stator and the at least a radial mounting block engages with the inner surface of the stator.

19 Claims, 12 Drawing Sheets

US 7,701,098 B2

MOUNTING STRUCTURE FOR A STATOR OF A MOTOR

BACKGROUND OF THE INVENTION

1. Field of the Invention

The present invention relates generally to a mounting structure, and more particularly to a mounting structure for a stator of a motor.

2. Description of Related Art

An electrical fan usually includes a frame, a bearing support formed at a middle of the frame, a stator disposed around the bearing support, and a rotor rotatably mounted surrounding the stator. The bearing support is for receiving a bearing therein. The bearing rotatably supports a rotor shaft which is connected with the rotor. The bearing support is usually made of plastic, and includes a central tube for fixedly positioning the stator.

In order to fixedly positioning the stator to the central tube, adhesive is often dispersed between an outer surface of the central tube and an inner surface of the stator so that the stator is adhered onto the central tube. This complicates the assembly of the electrical fan which decreases the assembly efficiency thereof and increases the cost of the electrical fan. Furthermore, the adhesive is made of nondegradable material which may cause environmental pollution. Therefore, the way for positioning the stator to the central tube needs to be improved.

SUMMARY OF THE INVENTION

The present invention relates to a mounting structure for a stator of a motor. According to a preferred embodiment of the present invention, the mounting structure includes a tube and a stator. The tube includes at least an axial positioning block and at least a radial mounting block. The stator defines an axis hole for receiving a portion of the tube therein, and at least a positioning groove in an inner surface thereof. One of the stator and the tube is rotated from an unlock position, where the at least an axial positioning block is located just above the at least a positioning groove, to a locked position, where a bottom surface of the at least an axial positioning block abuts a top surface of the stator and the at least a radial mounting block engages with the inner surface of the stator, whereby the stator is axially and radially secured to the tube.

Other advantages and novel features of the present invention will become more apparent from the following detailed description of preferred embodiment when taken in conjunction with the accompanying drawings, in which:

DETAILED DESCRIPTION OF THE INVENTION

Figure 1:
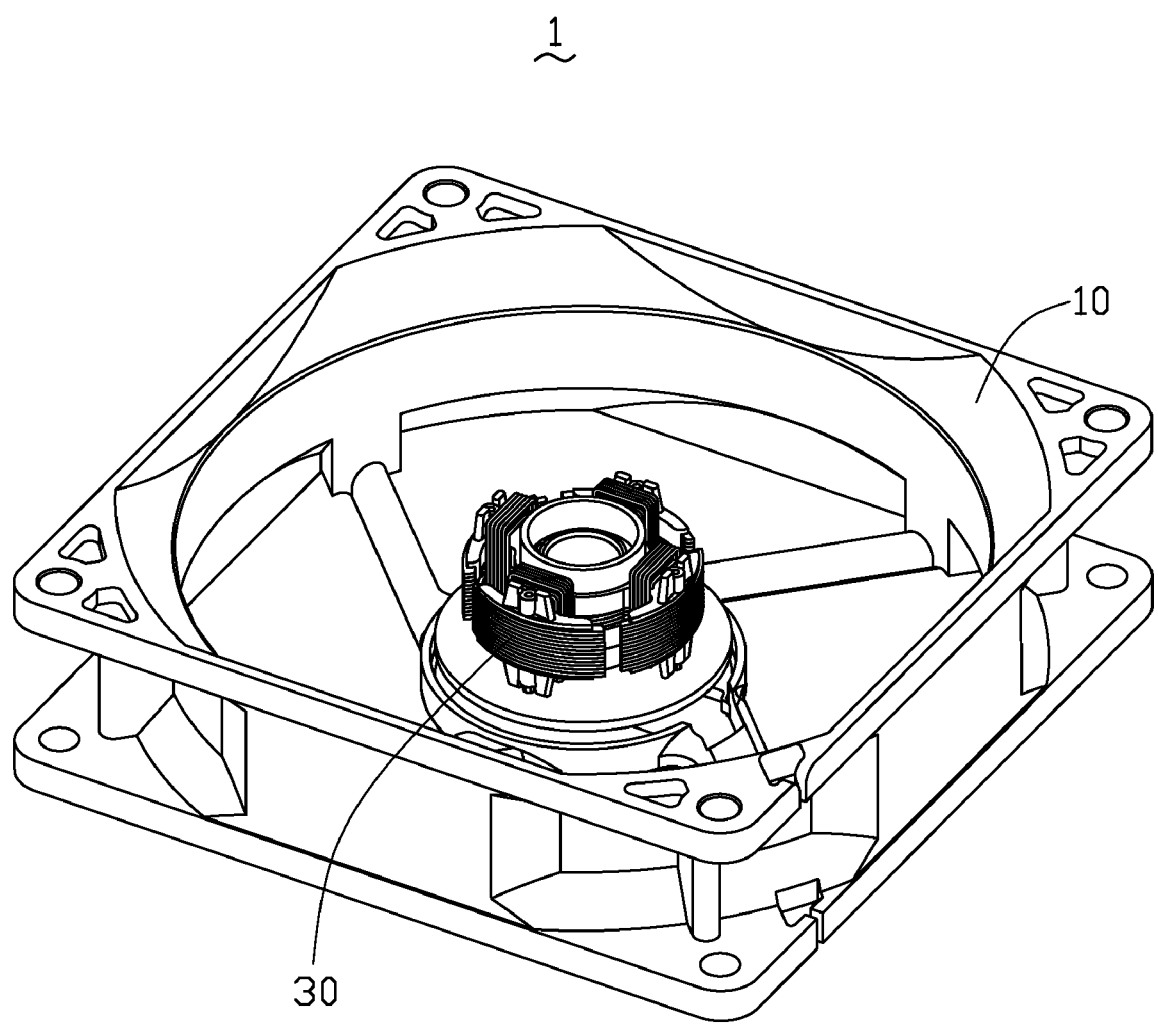
FIG. 1 is an isometric view of a fan motor containing a mounting structure according to a first embodiment of the present invention.

A mounting structure according to the present invention can be used in kinds of motors such as hard disk drive motors, or fan motors. Referring to FIG. 1, a fan motor 1 containing the mounting structure is shown. The fan motor 1 includes a frame 10, a motor-stator 30 mounted to the frame 10 and a rotor (not shown) rotatably disposed around the motor-stator 30. The mounting structure is used for mounting the motor-stator 30 onto a central tube 16 which integrally formed with the frame 10 of the fan motor 1.

Figure 4:
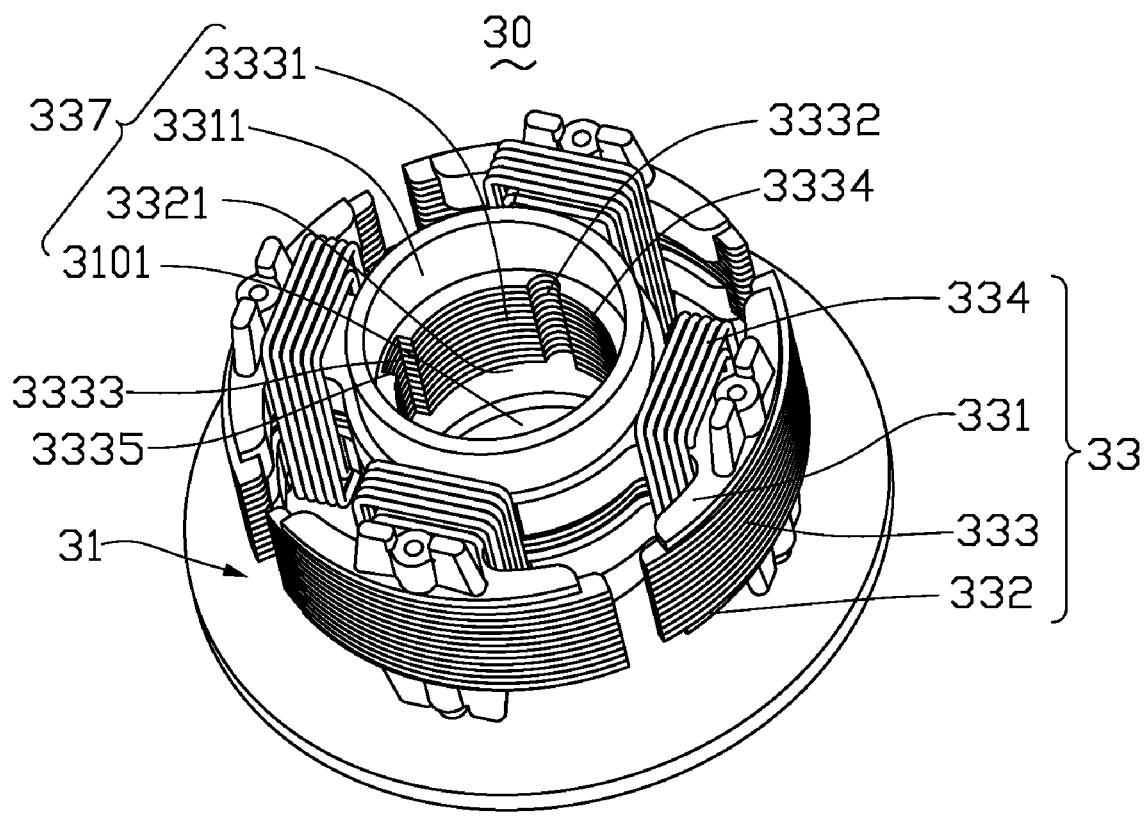
FIG. 4 is an isometric view of a motor-stator of the mounting structure of the fan motor.

Referring to FIG. 4, the motor-stator 30 includes a printed circuit board 31 and a stator 33 electrically connected with the printed circuit board 31. The printed circuit board 31 is annular shaped in profile and defines a central hole 3101 therein. The stator 33 is fixed to the printed circuit board 31 and includes a top insulator 331, a bottom insulator 332, a yoke assembly 333 sandwiched between the top and bottom insulators 331, 332 and a coil 334 disposed around teeth (not labeled) of the yoke assembly 333. The coil 334 electrically connects with the printed circuit board 31. The top and bottom insulators 331, 332 and the yoke assembly 333 respectively define central holes 3311, 3321, 3331 therein. The central holes 3311, 3321, 3331 of the top and bottom insulators 331, 332 and the yoke assembly 333 are coaxial with the central hole 3101 of the printed circuit board 31 so as to cooperatively form an axis hole 337 for the motor-stator 30. A diameter of the central hole 3331 of the yoke assembly 333 is less than that of the central holes 3311, 3321, 3101 of the top and bottom insulators 331, 332 and the printed circuit board 31. An inner surface of the yoke assembly 333 extends inwardly beyond inner surfaces of the top and bottom insulators 331, 332. The inner surface of the yoke assembly 333 defines two symmetrical positioning grooves 3332 and two symmetrical mounting grooves 3333 therein. The inner surface of the yoke assembly 333 includes four arc portions 3334 corresponding to an outer surface of the central tube 16 and two indent portions 3335 formed by the mounting grooves 3333 of the yoke assembly 333. The positioning grooves 3332 are semi-column shaped in profile, whilst the mounting grooves 3333 are rectangular shaped in profile.

Figure 2:
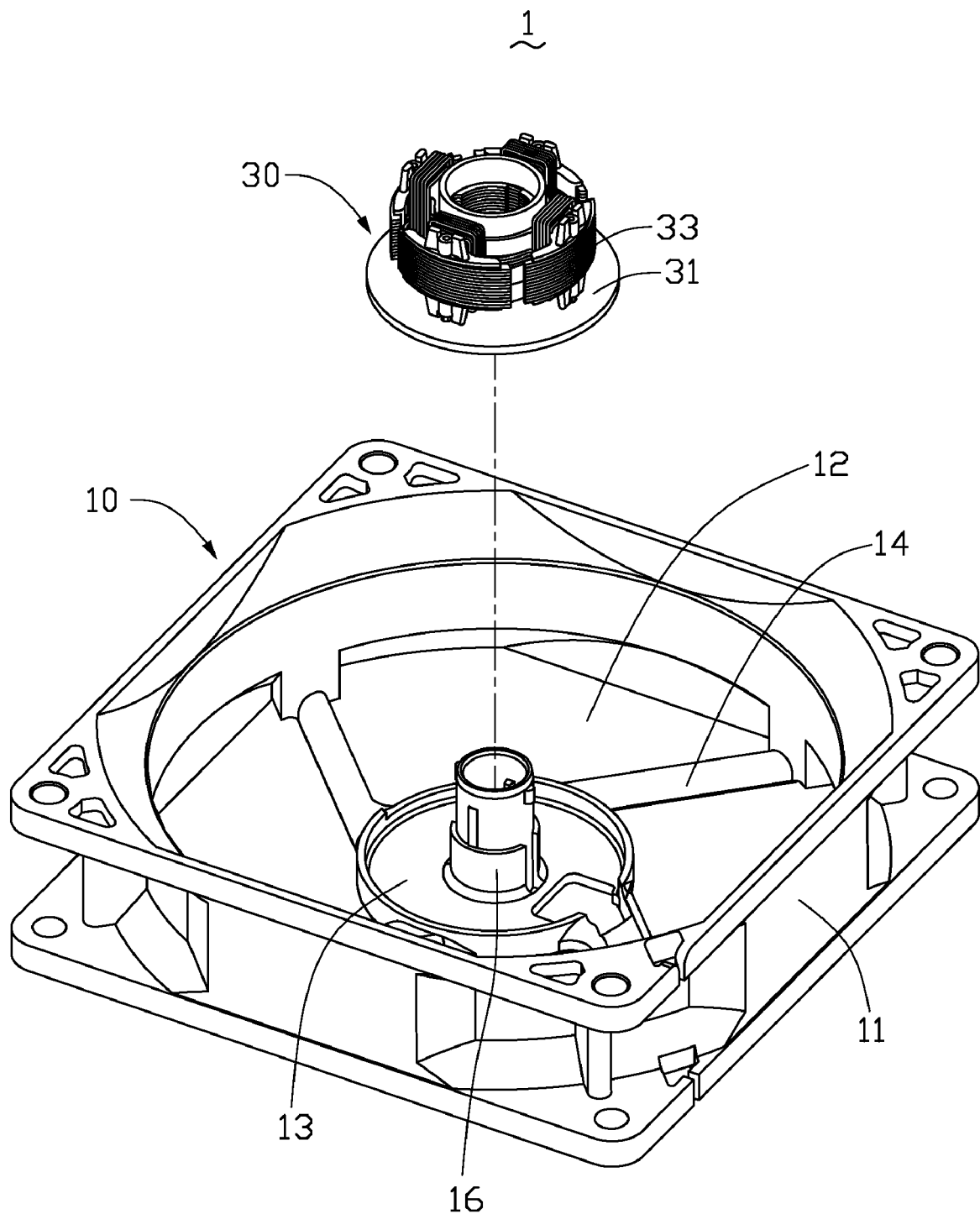
FIG. 2 is an exploded, isometric view of the fan motor of FIG. 1.

Referring to FIG. 2, the frame 10 of the fan motor 1 includes a rectangular shaped main body 11. The main body 11 of the frame 10 defines an accommodating space 12 for receiving the motor-stator 30 and the rotor therein. The frame 10 of the fan motor 1 further includes a circular supporting plate 13 at a bottom of the main body 11, and a plurality of ribs 14 integrally formed with the supporting plate 13 at the bottom of the main body 11. The central tube 16 is integrally formed with the supporting plate 13 and extends upwardly from a middle portion of the supporting plate 13 into the accommodating space 12. The supporting plate 13 extends an annular flange 15 from a periphery thereof. An annular recess 18 is therefore defined between the flange 15, a top surface of the supporting plate 13 and an outer wall of a bottom of the central tube 16.

Figure 3:
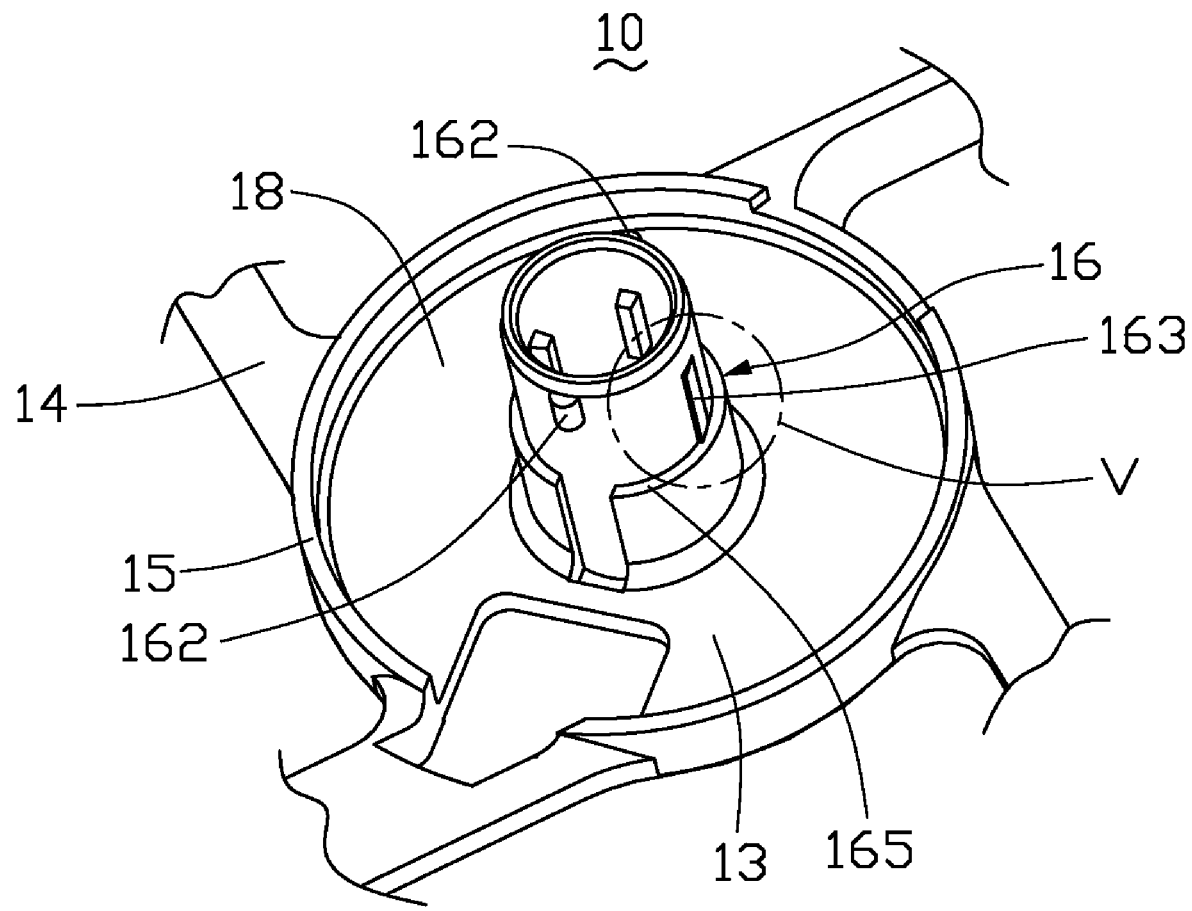
FIG. 3 is an isometric view of a central tube of the mounting structure of the fan motor.
Figure 5:
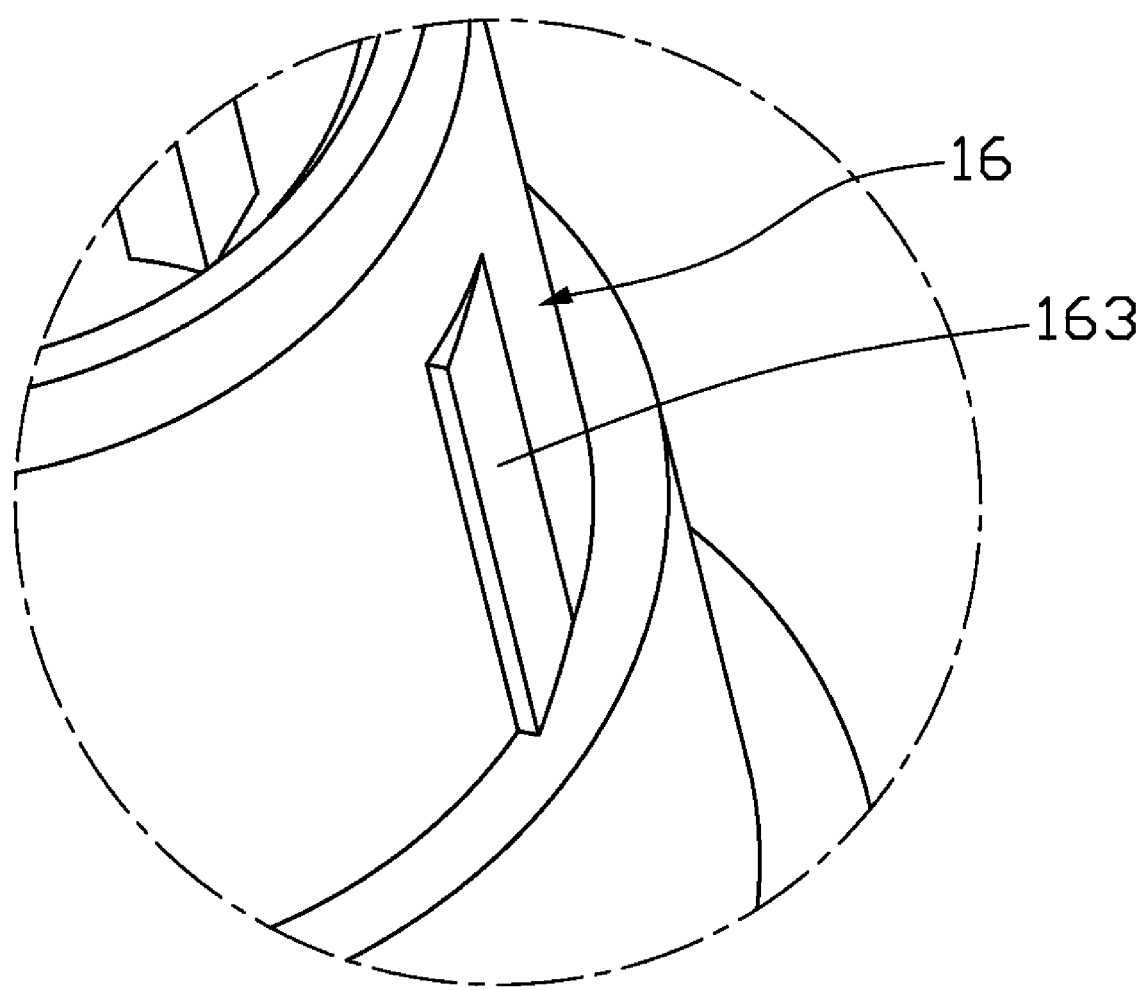
FIG. 5 is a partly enlarged view of FIG. 3, circled by V.

Particularly referring to FIGS. 3 and 5, the central tube 16 is a hollow cylinder. A diameter of the outer wall of the central tube 16 is slightly less than a diameter of the central hole 3331 of the yoke assembly 333. The central tube 16 extends through the central holes 3101, 3321, 3331, 3311 of the printed circuit board 31, of the bottom insulator 332, of the yoke assembly 333, and of the top insulator 331 in that order. The central tube 16 integrally and radially extends two axial positioning blocks 162 from a top end thereof. The positioning blocks 162 are symmetrically disposed on the outer wall of the central tube 16 and have semicircular shaped cross sections so as to match the positioning grooves 3332 of the yoke assembly 333. The central tube 16 integrally and radially extends two radial mounting blocks 163 at a middle portion thereof. The mounting blocks 163 are symmetrically disposed on the outer wall of the central tube 16 and corresponding to the mounting grooves 3333 of the yoke assembly 333. The mounting block 163 has a tapered cross section. A protrusion height of the mounting block 163 gradually increases along a circumferential direction of the central tube 16, as viewed clockwise from FIGS. 3 and 5. Alternatively, the mounting blocks 163 may be configured to arc shaped with a protrusion height thereof gradually increasing along the circumferential direction of the central tube 16. The central tube 16 integrally and radially extends an annular protrusion 165 from the outer wall of the central tube 16 at a bottom end thereof. A distance between a top surface of the protrusion 165 and a bottom surface of the positioning block 162 is substantially equal to a height of the yoke assembly 333 so that the yoke assembly 333 can be sandwiched between the protrusion 165 and the positioning blocks 162.

Figure 6:
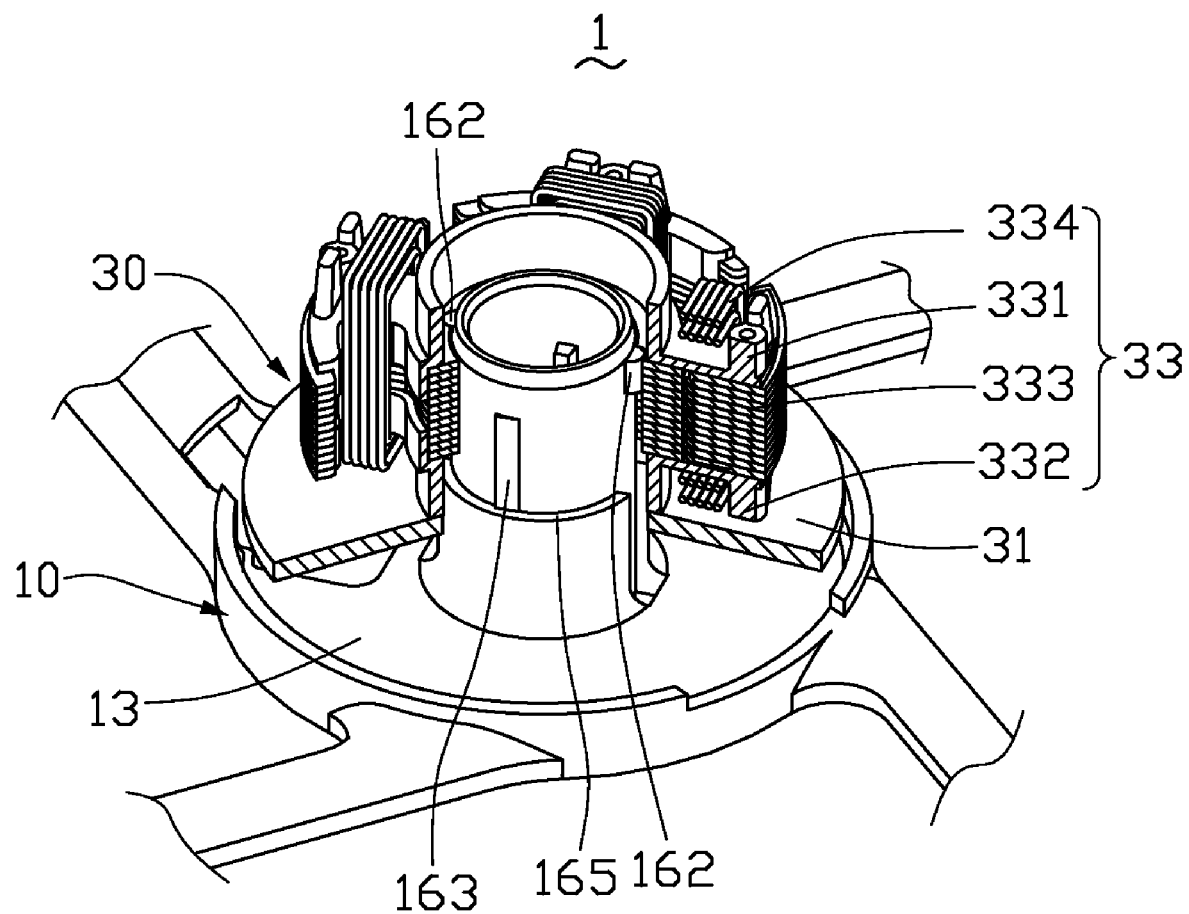
FIGS. 6 and 7 are assembled views of the fan motor of FIG. 1, respectively at unlock and locked positions and with different parts being cut away.
Figure 7:
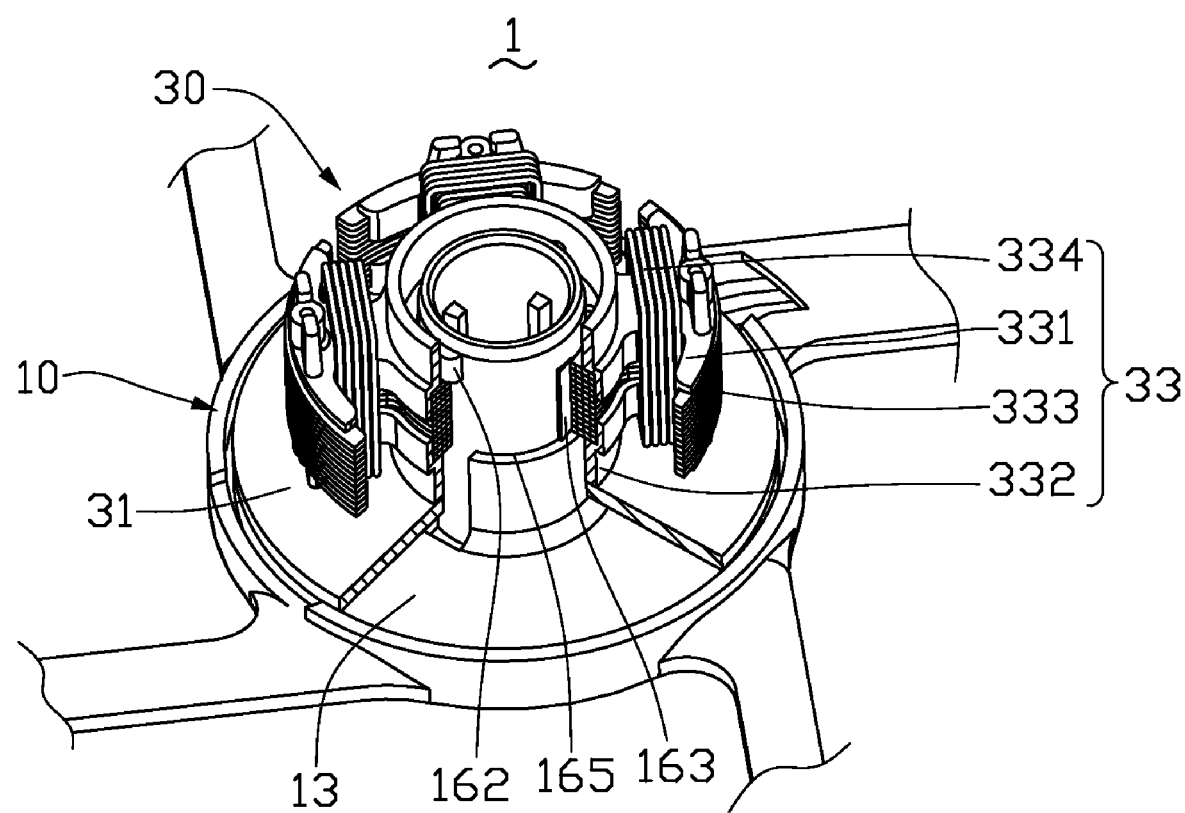

Referring to FIG. 6, in assembly of the fan motor 1, the motor-stator 30 is loosely disposed around the central tube 16 of the frame 10, with a part of the central tube 16 extending through the axis hole 337 of the motor-stator 30. Meanwhile, parts of the positioning blocks 162 of the central tube 16 extend through the positioning grooves 3332 of the yoke assembly 333, and the mounting blocks 163 of the central tube 16 are received in the mounting grooves 3333 of the yoke assembly 333. The motor-stator 30 is pressed downwardly until the printed circuit board 31 is received in the recess 18 of the frame 10 and the entire of the central tube 16 extends through the axis hole 337 of the motor-stator 30. Meanwhile, a bottom surface of the yoke assembly 333 abuts the top surface of the protrusion 165, and the bottom surfaces of the positioning blocks 162 are coplanar with a top surface of the yoke assembly 333. At this position, the positioning blocks 162 are located just above the positioning grooves 3332, respectively. Referring to FIG. 7, the motor-stator 30 is rotated from this position (unlock position) along the protrusion height increasing direction of the mounting block 163 of the central tube 16 (i.e., clockwise as viewed from FIG. 7) towards a locked position, where the mounting blocks 163 of the central tube 16 leave the corresponding mounting grooves 3333 and interferentially abut against the arc portions 3334 of the inner surface of the yoke assembly 333, to thereby radially securely mount the motor-stator 30 to the central tube 16. In the locked position, the positioning blocks 162 of the central tube 16 leave the corresponding positioning grooves 3332 of the yoke assembly 333 and abut the top surface of the yoke assembly 333 to thereby axially securely position the motor-stator 30 to the central tube 16.

In the assembly of the present mounting structure, the positioning blocks 162 and the mounting blocks 163 of the central tube 16 respectively abut against the top surface and the inner surface of the yoke assembly 333 to simultaneously axially and radially securely mount the motor-stator 30 to the central tube 16. There is no need to disperse the adhesive between the outer surface of the central tube 16 and the inner surface of the yoke assembly 333, which decreases the cost of the fan motor 1 and satisfies the need of environment protection. Moreover, the motor-stator 30 is assembled to the central tube 16 merely via press and rotation operations of the motor-stator 30, which simplifies the assembly of the mounting structure and further decreases the cost of the fan motor 1. Furthermore, the fan motor 1 can easily be disassembled after the assembly thereof. Therefore, components such as the motor-stator 30, or the frame 10 of the fan motor 1 can easily be changed, or repaired, which decreases the cost of the fan motor 1 further.

Figure 8:
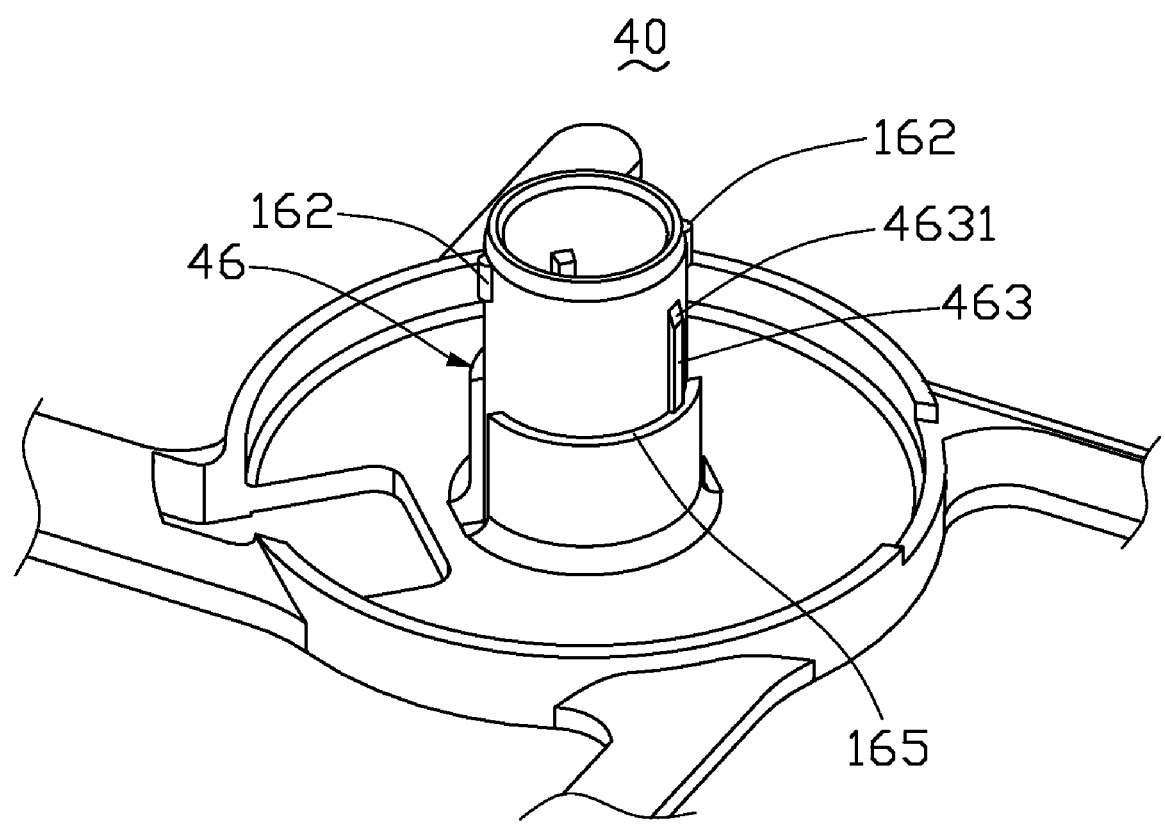
FIG. 8 is an isometric view of a central tube of a mounting structure according to a second embodiment of the present invention.
Figure 9:
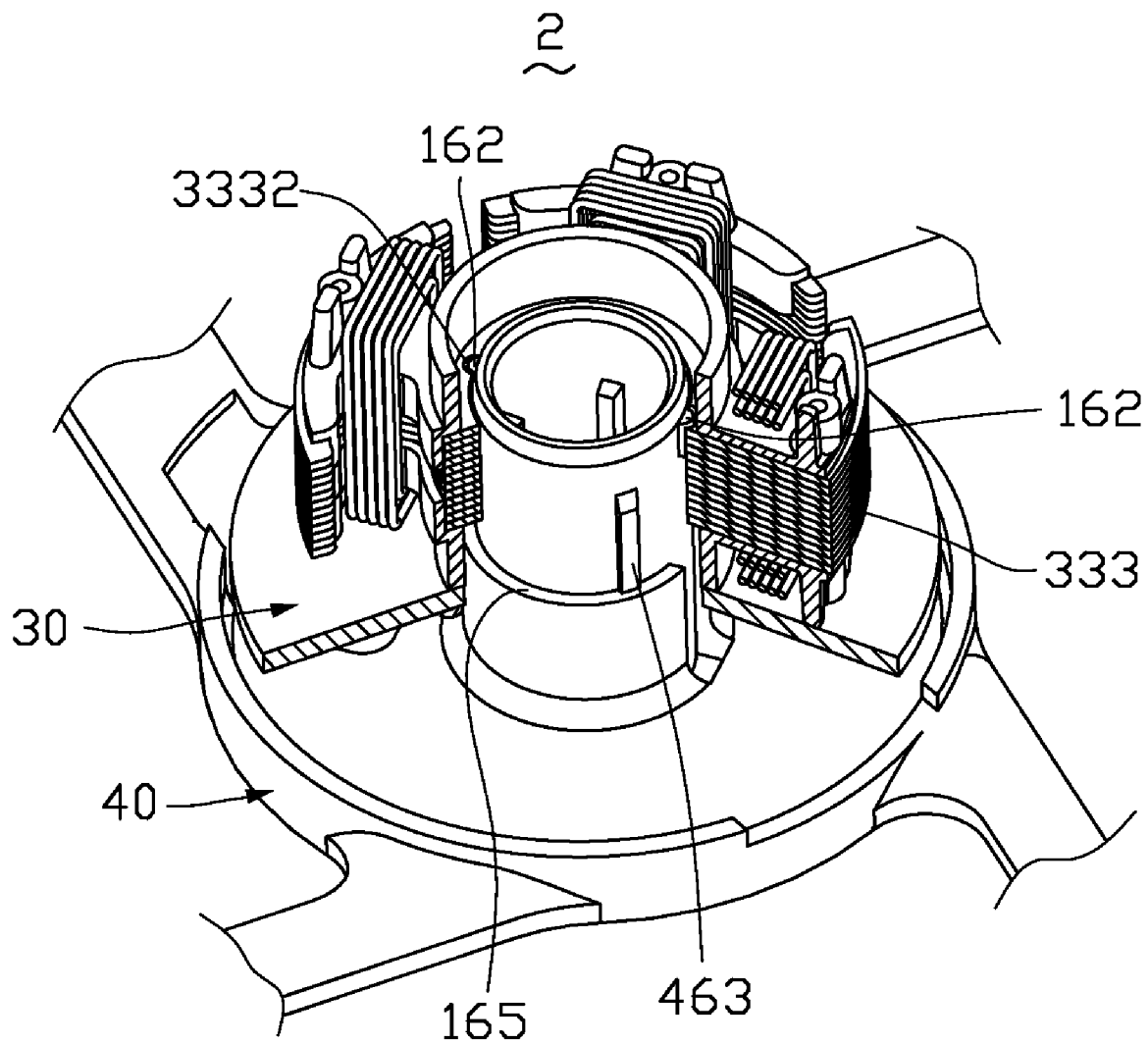
FIGS. 9 and 10 are assembled views of the mounting structure of FIG. 8, respectively at unlock and locked positions and with different parts being cut away.
Figure 10:
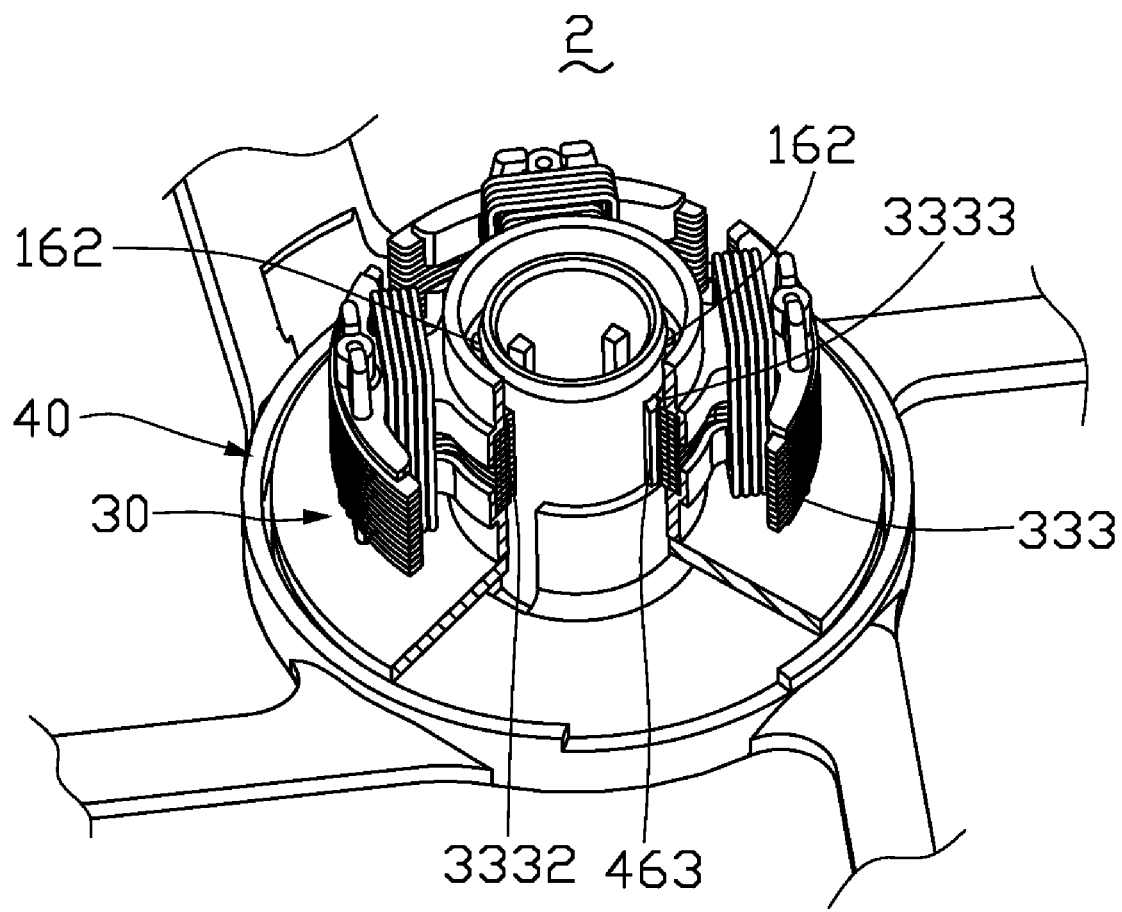

Referring to FIGS. 8 through 10, a second embodiment of the fan motor 2 according to the present invention is shown. In this embodiment, the mounting blocks 463 are preferably made of resilient materials such as plastics, or rubber. The mounting blocks 463 of the central tube 46 are prism-shaped in profile and offset from the mounting blocks 163 in the first embodiment. Therefore, the mounting blocks 463 of the central tube 46 offset from the mounting grooves 3333 of the yoke assembly 333 when the positioning blocks 162 of the central tube 46 align with the positioning grooves 3332 of the yoke assembly 333. The mounting block 463 forms a guiding surface 4631 at a top end thereof.

Particularly referring to FIG. 9, in assembly of the fan motor 2, the central tube 46 of the frame 40 is pressed into the axis hole 337 of the motor-stator 30. The positioning blocks 162 of the central tube 46 extend through the positioning grooves 3332 of the yoke assembly 333 until the bottom surfaces of the positioning blocks 162 are coplanar with the top surface of the yoke assembly 333 and the top surface of the protrusion 165 abutting the bottom surface of the yoke assembly 333. At this position, the positioning blocks 162 are located just above the positioning grooves 3332, respectively. Meanwhile, the inner surface of the motor-stator 30 is guided towards the protrusion 165 of the central tube 46 via the guiding surfaces 4631 of the mounting blocks 463 and interferentially abuts against of the mounting blocks 463. Referring to FIG. 10, the motor-stator 30 is forced to rotate along the circumferential direction of the central tube 46 so that the mounting blocks 463 of the central tube 46 are received in the corresponding mounting grooves 3333 and engaged with the indent portions 3335 of the inner surface of the yoke assembly 333 to thereby radially securely mount the motor-stator 30 to the central tube 46. In this position, the positioning blocks 162 of the central tube 46 leave the corresponding positioning grooves 3332 of the yoke assembly 333 and abut the top surface of the yoke assembly 333 to thereby axially securely position the motor-stator 30 to the central tube 46.

Figure 11:
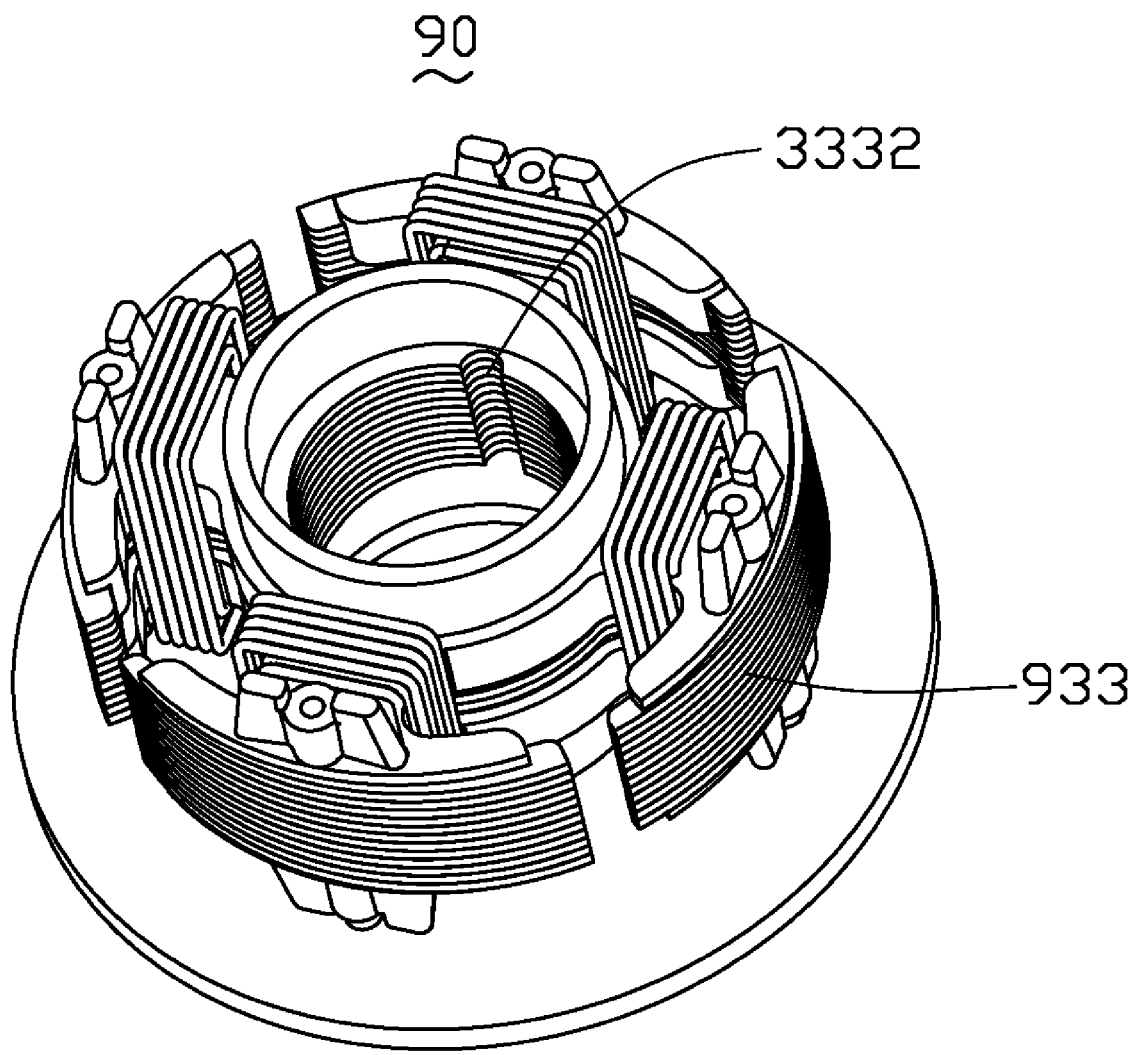
FIG. 11 is an isometric view of a motor-stator of a mounting structure according to a third embodiment of the present invention.
Figure 12:
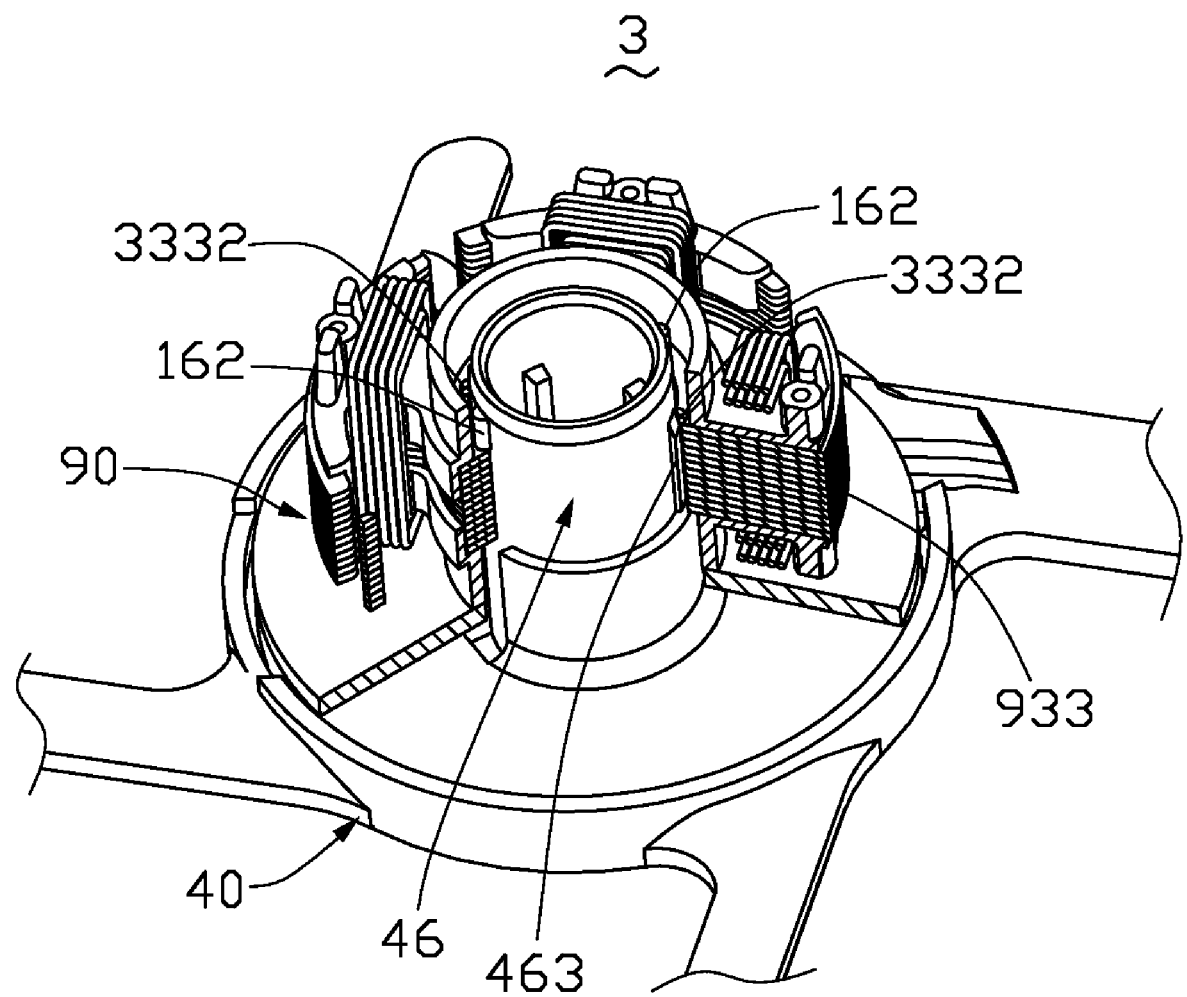
FIG. 12 are assembled view of the mounting structure of FIG. 11, with a part thereof being cut away.

Referring to FIGS. 11 and 12, a third embodiment of the fan motor 3 according to the present invention is shown. The difference between the third embodiment and the first embodiment is: the yoke assembly 933 of the third embodiment has the positioning grooves 3332 only and does not have the mounting grooves 3333 of the yoke assembly 33 of the first embodiment.

In assembly of the fan motor 3 of the third embodiment, the central tube 46 of the frame 40 is pressed into the axis hole 337 of the motor-stator 90. Meanwhile, the positioning blocks 162 of the central tube 46 extend through the positioning grooves 3332 of the yoke assembly 933 until the bottom surfaces of the positioning blocks 162 are coplanar with the top surface of the yoke assembly 933 and the top surface of the protrusion 165 abuts the bottom surface of the yoke assembly 933. At this position, the positioning blocks 162 are located just above the positioning grooves 3332, respectively. The central tube 46 has a structure the same as that of the central tube 46 of the second embodiment of FIG. 8. The inner surface of the motor-stator 90 is guided towards the protrusion 165 of the central tube 46 via the guiding surfaces 4631 of the mounting blocks 463 and interferentially abuts against of the mounting blocks 463. The motor-stator 90 is forced to rotate along the circumferential direction of the central tube 46 so that the mounting blocks 463 of the central tube 46 are received in the corresponding positioning grooves 3332 and engaged with indent portions of the inner surface of the yoke assembly 933 which are formed by the positioning grooves 3332 defined in the inner surface to thereby radially securely mount the motor-stator 90 to the central tube 46. In this position, the positioning blocks 162 of the central tube 46 leave the positioning grooves 3332 of the yoke assembly 933 and abut the top surface of the yoke assembly 933 to thereby axially securely position the motor-stator 90 to the central tube 46.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mounting structure for a motor comprising:
   a tube comprising at least an axial positioning block and at least a radial mounting block formed at an outer surface of the tube, wherein the at least an axial positioning block is formed near a top end of the tube; and
   a stator defining an axis hole for receiving a portion of the tube therein, and at least a positioning groove in an inner surface thereof, one of the stator and the tube being rotated relative to the other one of the stator and the tube from an unlock position, where the at least an axial positioning block is located just above the at least a positioning groove after passing through the at least a positioning groove along an axial direction of the stator, to a locked position, where the at least an axial positioning block is spaced from the at least a positioning groove a distance along a circumferential direction of the stator after moving away from the at least a positioning groove along the circumferential direction, and where a bottom surface of the at least an axial positioning block abuts a top surface of the stator and the at least a radial mounting block engages with the inner surface of the stator.

2. The mounting structure as described in claim 1, wherein the at least a radial mounting block has a tapered cross section, a protrusion height of the at least a radial mounting block gradually increasing along a circumferential surface of the tube, the inner surface of the stator comprising a plurality of arc portions corresponding to an outer surface of the tube and at least an indent portion formed by at least a mounting groove defined in the inner surface of the stator, the at least a radial mounting block being received in the at least an indent portion of the inner surface of the stator at the unlock position and engaging with the arc portions of the inner surface of the stator at the locked position.

3. The mounting structure as described in claim 1, wherein the at least a radial mounting block is made of resilient materials selected from plastics and rubber.

4. The mounting structure as described in claim 1, wherein the at least a radial mounting block is prism-shaped in profile.

5. The mounting structure as described in claim 4, wherein the inner surface of the stator comprises a plurality of arc portions corresponding to an outer surface of the tube and at least an indent portion formed by at least a mounting groove defined in the inner surface of the stator, the at least a radial mounting block abutting against the arc portions of the inner surface of the stator at the unlock position, and being received in and engaged with the at least an indent portion of the inner surface of the stator at the locked position.

6. The mounting structure as described in claim 4, wherein the inner surface of the stator comprises a plurality of arc portions corresponding to an outer surface of the tube and at least an indent portion formed by the at least a positioning groove defined in the inner surface of the stator, the at least a radial mounting block abutting against the arc portions of the inner surface of the stator at the unlock position, and being received in and engaged with the at least an indent portion of the inner surface of the stator at the locked position.

7. A fan motor comprising:
   a frame comprising a central tube, the central tube comprising at least an axial positioning block and at least a radial mounting block formed at an outer surface of the tube, wherein the at least an axial positioning block is formed near a top end of the tube; and
   a stator defining an axis hole for receiving the central tube therein, at least a positioning groove and at least a mounting groove in an inner surface thereof, the at least an axial positioning block extending through the at least a positioning groove of the stator so that the at least an axial positioning block is located just above the at least a positioning groove and then the at least a positioning groove is rotated with respect to the central tube to cause the at least an axial positioning block to leave the at least a positioning groove along a circumferential direction of the stator and make a bottom surface of the at least an axial positioning block abut a top surface of the stator, whilst the at least a mounting groove being rotated with respect to the central tube to make the at least a radial mounting block engage with the inner surface of the stator.

8. The fan motor as described in claim 7, wherein the at least a radial mounting block has a tapered cross section, a protrusion height of the at least a radial mounting block gradually increasing along a circumferential direction of the tube, the at least a mounting groove being rotated with respect to the central tube along the increasing direction of the protrusion height of the at least a radial mounting block.

9. The fan motor as described in claim 8, wherein the at least a radial mounting block moves from an inner side of the at least a mounting groove to an outer side thereof because of the rotation the at least a mounting groove.

10. The fan motor as described in claim 7, wherein the at least a radial mounting block is made of resilient materials selected from plastics and rubber.

11. The fan motor as described in claim 7, wherein the at least a radial mounting block is prism-shaped in profile and forms a guiding surface at a top portion thereof.

12. The fan motor as described in claim 11, wherein the at least a radial mounting block moves from an outer side of the at least a mounting groove to an inner side thereof because of the rotation the at least a mounting groove.

13. The fan motor as described in claim 7, wherein the stator comprises a top insulator, a bottom insulator, a yoke assembly sandwiched between the top and bottom insulators, the top and bottom insulators and the yoke assembly respectively defining a central hole therein, a diameter of the central hole of the yoke assembly being less than that of the central holes of the top and bottom insulators, the at least a positioning groove and the at least a mounting groove being defined in an inner surface of the yoke assembly.

14. The fan motor as described in claim 13, wherein the frame further comprises a supporting plate at a bottom thereof and a plurality of ribs connecting the supporting plate with the frame, the central tube being integrally formed with the supporting plate and extending a protrusion from an outer wall of a bottom portion of the central tube, a distance between a top surface of the protrusion and the bottom surface of the at least an axial positioning block being substantially equal to a height of the yoke assembly.

15. A fan motor comprising:
   a frame comprising a central tube, the central tube comprising at least an axial positioning block and at least a radial mounting block formed at an outer surface of the tube, wherein the at least an axial positioning block is formed near a top end of the tube; and
   a stator defining an axis hole for receiving a portion of the tube therein, and at least a positioning groove in an inner surface thereof, one of the stator and the tube being rotated relative to the other one of the stator and the tube from an unlock position, where the at least an axial positioning block is located just above the at least a positioning groove after passing through the at least a positioning groove along an axial direction of the stator, to a locked position, where the at least an axial positioning block is spaced from the at least a positioning groove a distance along a circumferential direction of the stator after moving away from the at least a positioning groove along the circumferential direction, and where a bottom surface of the at least an axial positioning block abuts a top surface of the stator and the at least a radial mounting block engages with the inner surface of the stator.

16. The fan motor as described in claim 15, wherein the at least a radial mounting block has a tapered cross section, a protrusion height of the at least a radial mounting block gradually increasing along a circumferential surface of the tube, the inner surface of the stator comprising a plurality of arc portions corresponding to an outer surface of the tube and at least an indent portion formed by at least a mounting groove defined in the inner surface of the stator, the at least a radial mounting block being received in the at least an indent portion of the inner surface of the stator at the unlock position and engaging with the arc portions of the inner surface of the stator at the locked position.

17. The fan motor as described in claim 15, wherein the inner surface of the stator comprises a plurality of arc portions corresponding to an outer surface of the tube and at least an indent portion formed by at least a mounting groove defined in the inner surface of the stator, the at least a radial mounting block abutting against the arc portions of the inner surface of the stator at the unlock position, and being received in and engaged with the at least an indent portion of the inner surface of the stator at the locked position.

18. The fan motor as described in claim 15, wherein the inner surface of the stator comprises a plurality of arc portions corresponding to an outer surface of the tube and at least an indent portion formed by the at least a positioning groove defined in the inner surface of the stator, the at least a radial mounting block abutting against the arc portions of the inner surface of the stator at the unlock position, and being received in and engaged with the at least an indent portion of the inner surface of the stator at the locked position.

19. The fan motor as described in claim 15, wherein the frame further comprises a supporting plate at a bottom thereof and a plurality of ribs connecting the supporting plate with the frame, the central tube being integrally formed with the supporting plate and extending a protrusion from an outer wall of a bottom portion of the central tube, a distance between a top surface of the protrusion and the bottom surface of the at least an axial positioning block being substantially equal to a height of the yoke assembly.

* * * * *